United States Patent [19]

Hiramatsu et al.

[11] Patent Number: 4,787,020

[45] Date of Patent: Nov. 22, 1988

[54] FULL-WAVE OUTPUT TYPE FORWARD CONVERTER

[75] Inventors: Rihei Hiramatsu, Tokyo; Tokunari Inoue, Machida; Kazushi Watanabe, Nagaoka, all of Japan

[73] Assignee: Nemic-Lambda K.D. and Densetsu Corporation, Tokyo, Japan

[21] Appl. No.: 156,208

[22] Filed: Feb. 16, 1988

[30] Foreign Application Priority Data

Feb. 16, 1987 [JP] Japan .................................. 62-33117

[51] Int. Cl.[4] .......................................... H02M 3/335
[52] U.S. Cl. ......................................... 363/20; 363/21; 363/95; 363/134
[58] Field of Search ...................... 363/20, 21, 24, 25, 363/95, 97, 131, 133, 134

[56] References Cited

U.S. PATENT DOCUMENTS 4,274,133  6/1981  Cuk et al. ........................ 363/20 X
4,559,590  12/1985  Davidson .............................. 363/21

FOREIGN PATENT DOCUMENTS 223586  6/1985  Fed. Rep. of Germany ........ 363/21
106362  6/1985  Japan ..................................... 363/20
1152074  4/1985  U.S.S.R. ............................... 363/20

OTHER PUBLICATIONS

"Switching Regulator with Dual-Switches and Dual Clamp Circuits", Hoffman Jr., IBM Technical Disclosure Bulletin, vol. 17, No. 7, 12/74.
"A New Zero Ripple Switching DC to DC Converter and Integrated Magnetics", Cuk, IEEE Electronics Specialist Conference, Jun. 1980.

Primary Examiner—Patrick R. Salce
Assistant Examiner—Emanuel Todd Voeltz
Attorney, Agent, or Firm—Burgess, Ryan & Wayne

[57] ABSTRACT

Disclosed is a full-wave output type forward converter wherein a main transformer having a primary winding connected in series with a switching element includes two secondary windings as winding halves divided by a center tap and electromagnetically coupled. A leakage self inductance can be reduced to obtain a high-frequency, high-power arrangement.

1 Claim, 6 Drawing Sheets

FIG.7 - PRIOR ART
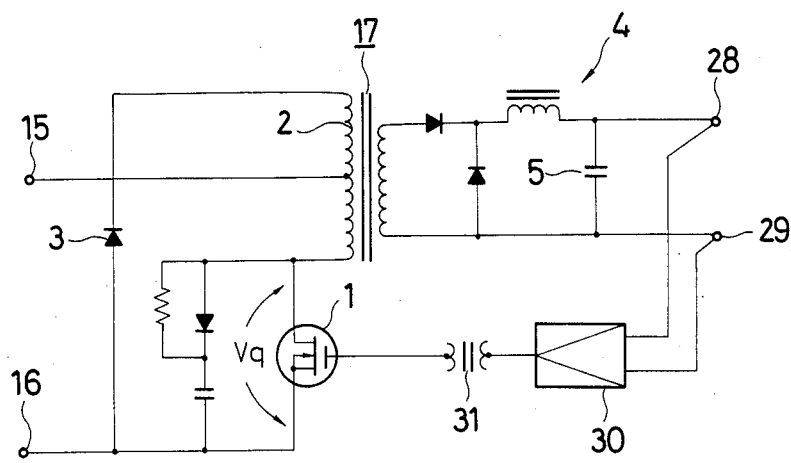
FIG.9 - PRIOR ART
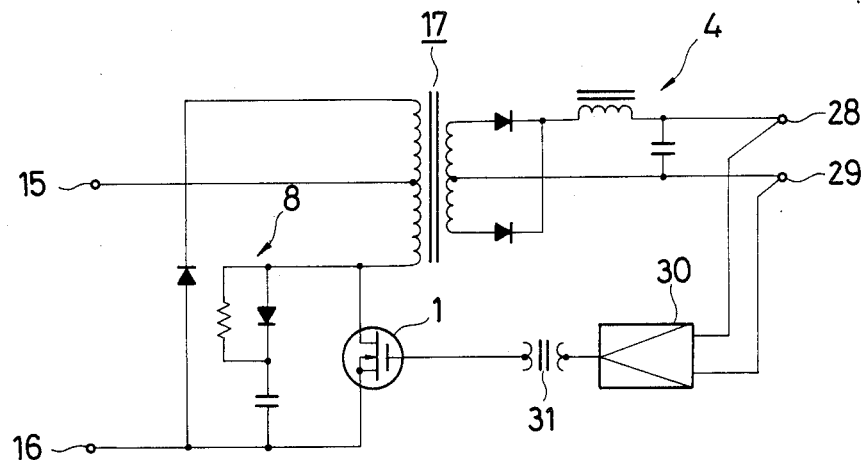

FIG. 8 -PRIOR ART
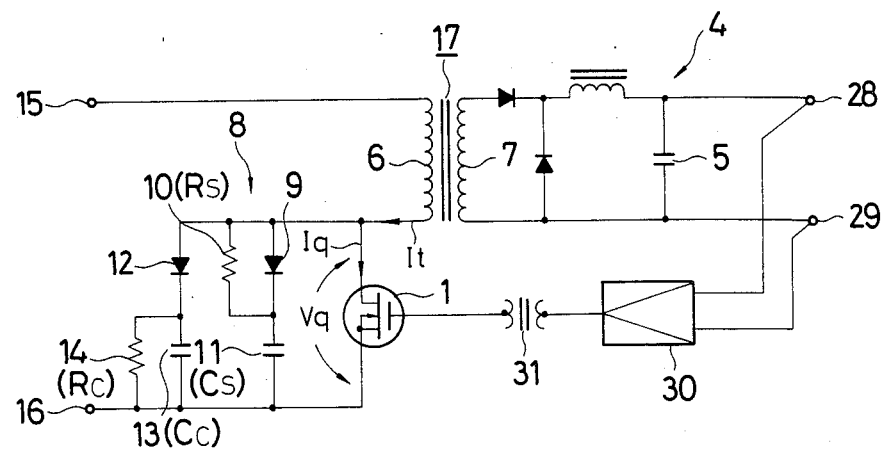
FIG. 10 -PRIOR ART
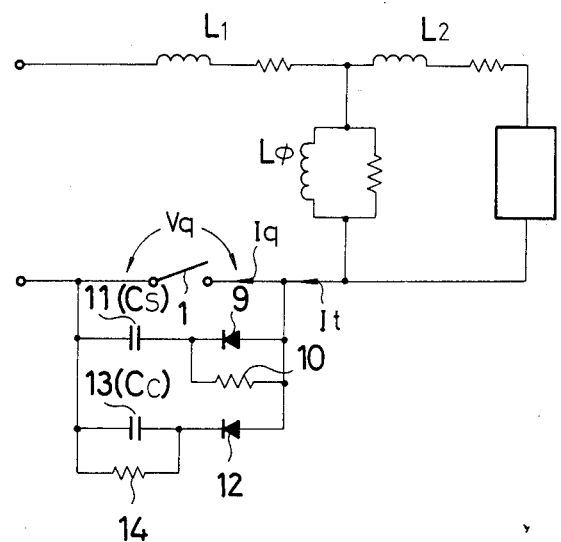

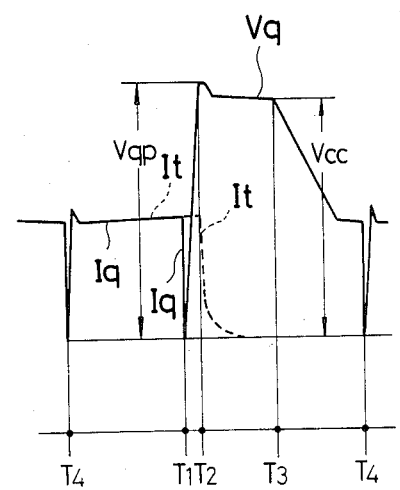
FIG. 11 -PRIOR ART

FULL-WAVE OUTPUT TYPE FORWARD CONVERTER

BACKGROUND OF THE INVENTION

I. Field of the Invention

The present invention relates to a low-voltage (2 to 5 V), large-current (20 to 200 A) type forward converter primarily operated at a high frequency of 500 to 1,000 kHz and, more particularly, to a compact full-wave output type forward converter with high reliability and high efficiency.

II. Description of the Prior Art

FIG. 7 shows a typical conventional forward converter. A drain-source voltage Vq of a MOSFET 1 as a switching element is clamped by a reset winding 2 and a diode 3. Since this circuit outputs a half-wave signal, the ON time ratio of the FET 1 is limited to normally 45% or less, and a filtering effect at the output side is degraded. In addition, a chemical capacitor having a large capacitance and a large size must be used as a capacitor 5 in a filter 4. For this reason, the decreases in capacitance and size of the capacitor, which can be achieved by a high-frequency arrangement, are limited to a certain degree.

FIG. 8 shows another conventional forward converter in which energy obtained by clamping a drain-source voltage Vq is consumed by an impedance of a circuit consisting of a resistor 14 (Rc) and a capacitor 13 (Cc). The ON time ratio of an FET 1 can be increased to 50% or more. However, the peak value of the drain-source voltage Vq is increased in proportion to the output power. Therefore, this forward converter can be used only when a low output is required.

FIG. 9 is still another conventional forward converter introduced some time between 10 and 20 years ago. Although this converter aims at reducing the size of a filter 4 on the output side, an object of the present invention cannot be achieved. This conventional converter has never been popular in practical applications.

The problems posed by the conventional converters shown in FIGS. 8 and 9 will be analyzed.

An equivalent circuit of FIG. 8 can be illustrated as in FIG. 10. Reference symbol $L_1$ denotes a leakage self conductance of a primary winding 6; and $L_2$, a leakage self inductance of a secondary winding 7 which is calculated as a value on the primary side.

FIG. 11 is a graph showing a drain-source voltage Vq, a drain current Iq, and a transformer current It in the converter shown in FIG. 8. The graph in FIG. 11 will be described together with the circuit shown in FIG. 10.

When an FET 1 is turned off at time $T_1$, theoretically, the drain current Iq is immediately decreased. The transformer current It is not cutoff by energy of $\{(L_1+L_2)\sqrt{Iq^2}\}/2$ accumulated in the windings $L_1$ and $L_2$ and continuously flows through a diode 9 and a capacitor 11 in a snubber circuit 8 until time $T_3$. In this case, equation (1) below can be established:

$$\{(L_1+L_2)\cdot Iq^2\}/2 = (Cs\cdot Vqp^2)/2 \ldots \quad (1)$$

for Vqp=Vcsp, and the voltages Vcs and Vq rise from zero at time $T_1$. A resistor 10 has a resistance enough to discharge the voltage Vcs of the capacitor 11 to zero for a duration between time $T_4$ and time $T_1$. Excitation energy accumulated by L$\phi$ is discharged by a clamp circuit consisting of a diode 12 and a capacitor 13 for a duration between time $T_2$ and time $T_3$. In a practical circuit, at time $T_2$ when Vq is maximized to Vqp, a charge current is supplied to the capacitor 13, and the transformer current It between time $T_2$ and $T_1$ cannot be observed. In this case, a resistor 14 serves as a discharge resistor for maintaining a voltage Vcc of the capacitor 13 at a safe value and thus has a high resistance.

When equation (1) is taken into consideration, condition Vqp $\propto$ Iq is established. In other words, the voltage Vqp is increased in proportion to Iq, i.e., a load current. This indicates that the conventional converter can be used in only a low-power arrangement. An increase in capacitance of the capacitor 11 allows a decrease in Vqp. However, this indicates a loss in the resistor 10 during discharging of the capacitor 11 for a duration between time $T_4$ and time $T_1$. Therefore, a sufficiently large capacitance cannot be usually used.

Equation (1) will be further examined. Condition $L_2 > L_1$ is generally established in a low-voltage output circuit. If energy accumulated by $L_2$ is set so as not to influence an increase in Vq, the value of the right-hand side of equation (1) is apparently decreased together with both the values of Cs and Vqp.

The conventional converter in FIG. 9 can more or less suppress the influence of $L_2$. However, as compared with the conventional converter in FIG. 8, $N_2$ (FIG. 9) $= N_2/2$ (FIG. 8) is established with identical output voltages. Therefore, $L_1$ is increased by an increase in $N_1/N_2$ winding ratio, and the voltage Vqp is increased.

In summary, in the conventional arrangements, the voltage Vqp is increased in proportion to the output voltage to cause an increase in a voltage stress acting on the switching element, thereby degrading circuit reliability. If the capacitance Cs is increased in order to prevent the above problem, the internal loss is increased and energy conversion efficiency is degraded. Therefore, the conventional converters are used as only low-power converters.

SUMMARY OF THE INVENTION

It is a principal object of the present invention to provide a full-wave output type forward converter wherein a voltage Vqp can be effectively suppressed to reduce a voltage stress acting on a switching element, circuit reliability and energy conversion efficiency can be improved, and a wider power capacity range of the converter can be obtained.

In order to achieve the above object of the present invention, a main transformer having a primary winding connected in series with a switching element comprises an iron core having a gap and secondary windings arranged such that two windings divided by a center tap are alternately connected at the turn start and end portions so as to alternately arrange the two windings, wherein anodes of two diodes are respectively connected to one end of a corresponding one of the secondary windings and the center tap, cathodes of these diodes are connected to one end of a corresponding one of choke coils, the other end of one choke coil is connected to the other end of the other choke coil to constitute one output terminal, the center tap serves as the other output terminal, and a capacitor is connected between the output terminals.

With the above arrangement, excellent electromagnetic coupling can be obtained between the divided secondary windings. This arrangement is equal to that having two parallel half-wave forward type output circuits to reduce the leakage self inductance. Even if the capacitance of the snubber circuit is decreased, the voltage Vqp can be effectively suppressed.

The above and other objects, features, and advantages of the present invention will be apparent from the following detailed description in conjunction with the accompanying drawings.

BRIEF DESCRIPTION OF THE DRAWINGS

FIG. 7 is a circuit diagram showing a typical conventional forward converter;

FIGS. 8 and 9 are circuit diagrams showing other conventional forward converters, respectively;

FIG. 10 is an equivalent circuit diagram of FIG. 8; and

FIG. 11 is a graph showing the voltage vs. current characteristics.

DESCRIPTION OF THE PREFERRED EMBODIMENTS

Figure 1:
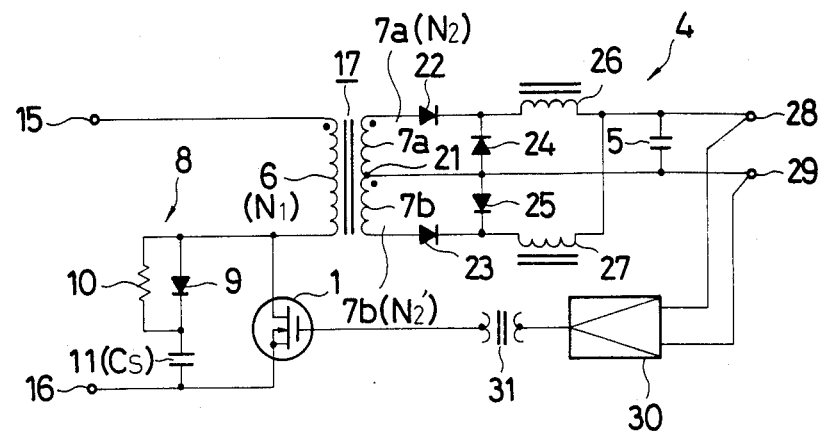
FIG. 1 is a circuit diagram showing a full-wave output type forward converter according to an embodiment of the present invention.
Figure 2:
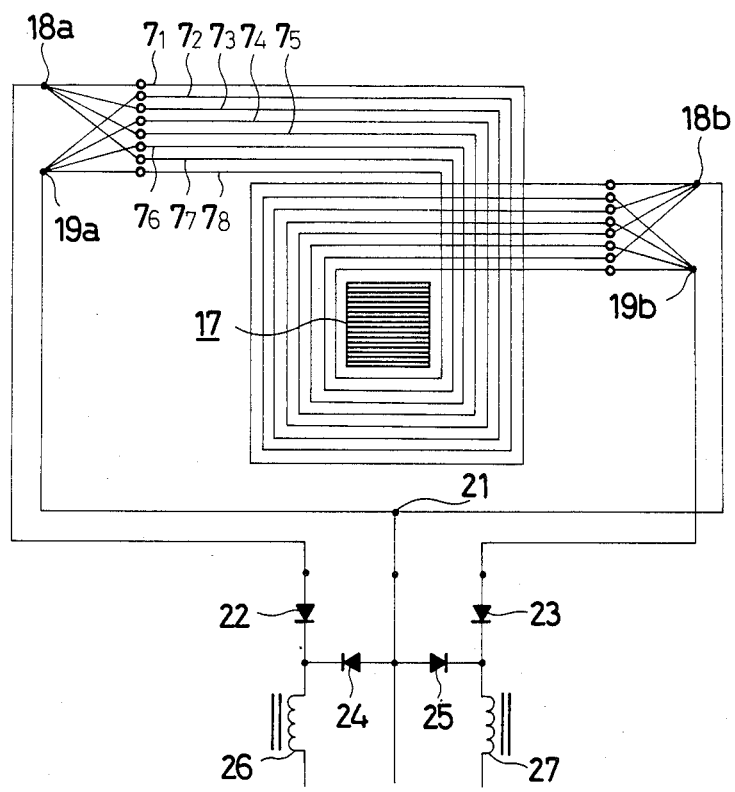
FIG. 2 is a diagram showing the connection of a secondary winding of the converter shown in FIG. 1.

FIG. 1 shows an embodiment of the present invention. Reference numeral 15 and 16 denote DC voltage input terminals; 1, an FET serving as a switching element; 17, a main transformer; and 8, a snubber circuit. The snubber circuit 8 comprises a diode 9, a resistor 10, and a capacitor 11. In order to obtain the same voltage, the secondary winding of the main transformer 17 is obtained by turning a wire twice that in the conventional converter of FIG. 9 and is divided into halves to constitute secondary windings 7a and 7b. Each of windings $7_1, 7_2, \ldots 7_n$ of the winding 7a or 7b made of a plurality of formal wires independently consists of one to several turns, as shown in FIG. 2. Start portions of the plurality of windings $7_1, 7_2, \ldots 7_n$ are grouped into odd- and even-numbered start portions. The odd- and even-numbered start portions are connected at points 18a and 19a, respectively. Similarly, odd- and even-numbered end portions are also connected at points 18b and 19b, respectively. The points 18b and 19a of the secondary windings 7a and 7b are connected to each other to constitute a center tap 21. Diodes 22 and 23 are connected to the points 18a and 19b, respectively. Rectifying diodes 24 and 25 are connected between the cathodes of the diodes 22 and 23 and the center tap 21 of the main transformer 17 such that the directions of the cathodes of the diodes 22 and 23 are the same as those of the cathodes of the diodes 24 and 25, respectively. One end of each of choke coils 26 and 27 is connected to a corresponding connecting point of the diodes 22 and 24 or the diodes 23 and 25. The other end of the choke coil 26 is connected to the other end of the choke coil 27 to constitute an output terminal 28. A capacitor 5 is inserted between the output terminal 28 and an output terminal 29 of the center tap 21. As a result, the circuit arrangement is equal to two parallel half-wave forward type output circuits connected to the secondary side of the main transformer 17.

A detector 30 is connected between the output terminals 28 and 29 in the same manner as in the conventional circuit. An output of the detector 30 is connected to the gate of the FET 1 through an isolator 31.

Figure 3:
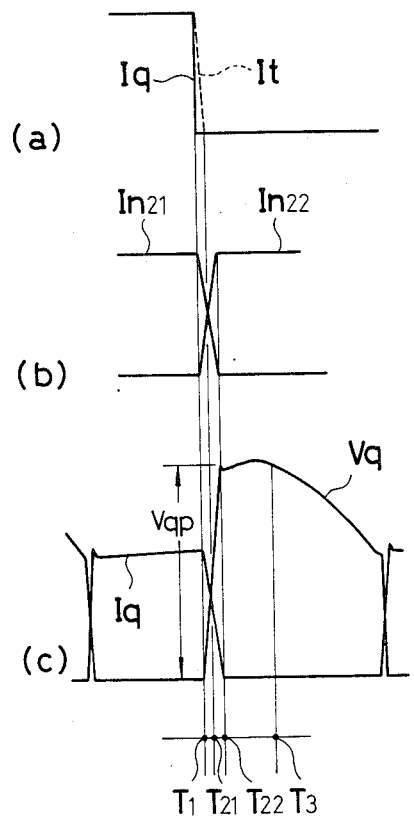
FIGS. 3(a) to 3(c) are graphs showing electrical characteristics of the converter shown in FIG. 1.

The operation of this embodiment will be described below. As shown in FIG. 1, electromagnetic coupling between the divided secondary windings 7a and 7b is excellent. Therefore, as shown in FIG. 3(b), most of a current $In_{21}$ of the secondary winding 7a flows as a current $In_{22}$ of the secondary winding 7b when the FET 1 is turned off. In the conventional forward converter shown in FIG. 8, energy accumulated in the leakage self inductance by the current flowing through the secondary winding 7 is charged to the primary winding side simultaneously when the FET 1 is turned off. In this state, the transformer current It continuously flows to charge the capacitor 11. In this case, the primary side results in power loss. However, with the arrangement shown in FIG. 1, the primary current Iq and the transformer current It behave as shown in FIG. 3(a). A small difference between the currents It and Iq is accumulated by the capacitor 11 in the snubber circuit 8. Therefore, the voltage Vqp can be effectively suppressed by a capacitor having a very small capacitance, as shown in FIG. 3(c). Energy of the $L\phi$ portion is charged until time $T_3$, and the voltage value at time $T_3$ is a maximum value of the voltage Vq. As is apparent from FIG. 3(b), the secondary current is shifted to the output side and is not adversely affected by a load current. Therefore, equation (1) in the prior art can be rewritten as equation (2) in the present invention:

$$(L_1 \cdot I_g^2)/2 = (C_s \cdot V_{qp}^2)/2 \tag{2}$$

Good influences on Cs and Vqp are apparent as compared with equation (1).

Necessity of an air gap in the main transformer 17 will be described with reference to FIGS. 4, 5, and 6.

Figure 4:
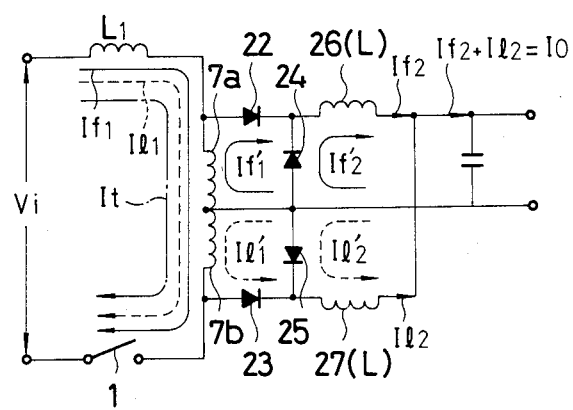
FIG. 4 is an equivalent circuit diagram of FIG. 1.

FIG. 4 is an equivalent circuit of FIG. 1. Reference symbol L denotes a filtering inductance on the output side. Since the leakage inductance $L_2$ does not have a magnitude which adversely affects the operation, a description thereof is omitted in the present invention. FIG. 5 shows voltage and current waveforms in the respective parts, and FIG. 6 shows a B-H loop.

Figure 5:
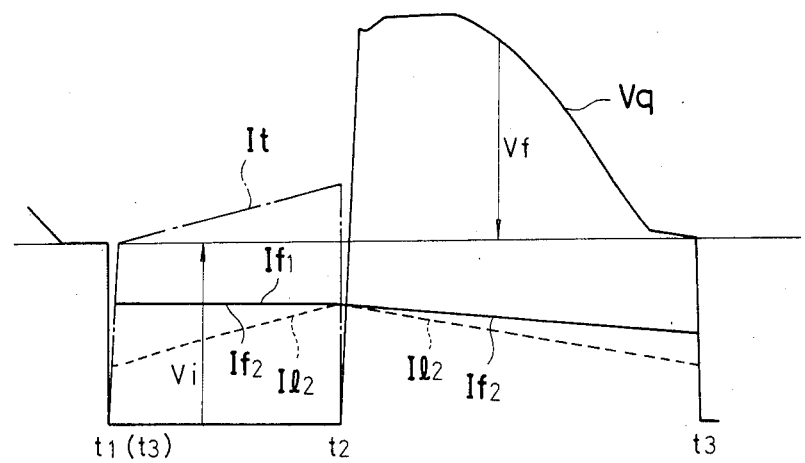
FIG. 5 is a graph showing the voltage vs. current characteristics.

When the FET 1 is kept on between time $t_1$ and time $t_2$ in FIG. 5, a current $If_1'$ caused by the $N_1/N_2$ ratio flows through the secondary winding 7a and is output through the diode 22 and the choke coil 26 without changes, as shown in FIG. 4. When the FET 1 is turned off, a current $If_2'$ flows through the rectifying diode 24 and the choke coil 26 and the current $If_2$ shown in FIG. 5 can be obtained.

A current $Il_l$ by the $L\phi$ caused by the air gap in the main transformer 17 flows for a duration between time $t_1$ and time $t_2$. In this duration, the above current is shunted by the diode 23 and cannot be output. In this case, a current $Il_2'$ flowing through the diode 25 appears. For a duration between time $t_2$ and $t_3$, energy accumulated in the excitation impedance $L\phi$ of the main transformer 17 by the peak value of the current $Il_1$ at time $t_2$ is changed into a current $Il_1'$, which is then supplied to the diode 23. This energy is supplied to the diode 25 and the choke coil 27 and appears as a current $Il_2'$. A sum of the currents $Il_1'$ and $Il_2'$ serves as the current $Il_2$, as shown in FIGS. 4 and 5. A final output current $I_0$ is given as follows:

$$I_0 = If_2 + Il_2$$

A total input current It is given as follows:

$$It = If_1 + Il_1$$

As for the current $Il_1'$ at time $t_2$, the current $If_1'$ is rectified to the current $Il_1'$ electromagnetic coupling between the secondary windings 7a and 7b. It should be noted that the energy source is the excitation energy of $L\phi$.

Figure 6:
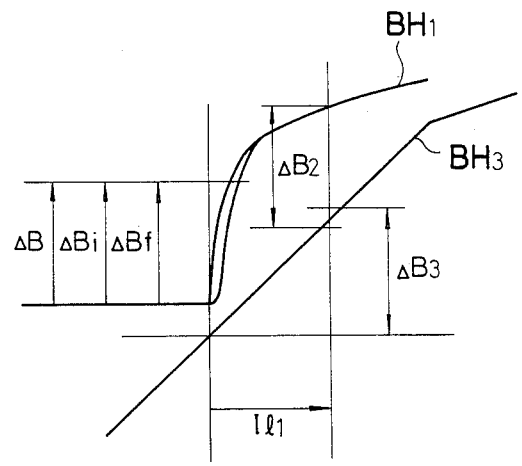
FIG. 6 is a graph showing B-H characteristics.

FIG. 6 shows the B-H loop in the transformer operation in FIG. 5. Reference symbol $BH_1$ represents a case wherein an air gap is not formed; and $BH_3$ represents a case wherein an air gap is formed. In the conventional forward converter without the winding 7b, no air gap is formed in the transformer. Its B-H loop is given as $BH_1$ in FIG. 6, and a change in flux density in the transformer is given as $\Delta Bi$.

The range of changes in flux density is defined as follows:

$$+\Delta Bi = \int_{t_1}^{t_2} Vi\,dt$$

$$-\Delta Bf = \int_{t_2}^{t_3} Vf\,dt$$

When the secondary winding 7b is added as in the present invention, the current $Il_1$ (time $t_2$) serving as the excitation current in FIG. 5 is required. If the loop of $BH_1$ is used without modifications, the amplitude of the magnetic flux is given as $\Delta B_2$. The currents $Il_1$ and It are saturated to cause an increase in core loss and may cause other problems.

If $BH_3$ in FIG. 6 is obtained by providing a gap in the iron core, the above drawbacks can be eliminated, and the absolute value of the amplitude range is identical as follows:

$$\Delta Bi = \Delta B_2 = \Delta B_3$$

As described above, the largest obstacle against a high-frequency, high-power switching operation is an increase in loss caused by charging/discharging of the capacitor in the snubber circuit. According to the present invention, however, good electromagnetic coupling between the divided secondary windings can be obtained, and the leakage inductance can be reduced. As is apparent from a comparison between equations (1) and (2), the voltage $Vqp$ can be effectively suppressed by a capacitor having a smaller capacitance than that in the conventional forward converter. In the conventional forward converter, the voltage $Vqp$ is increased in proportion to an increase in load current. However, according to the present invention, this influence is small, and the clamp circuit can be advantageously omitted. In addition, a high-frequency (1,000 kHz) converter of pulse width modulation type can be obtained. As a result, the capacitor in the output section can be replaced with a compact film capacitor, thereby achieving high reliability, high efficiency, and compactness.

What is claimed is:

1. A full-wave output type forward converter comprising a power input unit obtained by connecting a switching element in series with a primary winding of a main transformer and an output unit obtained by connecting a rectifier circuit and a filter circuit to secondary windings of said main transformer, said converter being adapted to detect and amplify an output voltage from said output unit to control an ON time ratio of said switching element, wherein said main transformer comprises an iron core having a gap and said secondary windings arranged such that two windings divided by a center tap are alternately connected at the turn start and end portions so as to alternately arrange said two windings, anodes of two diodes are respectively connected to one end of a corresponding one of said secondary windings and said center tap, cathodes of said diodes are connected to one end of a corresponding one of choke coils, the other end of one choke coil is connected to the other end of the other choke coil to constitute one output terminal, said center tap serves as the other output terminal, and a capacitor is connected between said output terminals.

* * * * *